Kerr, Grant & Potter. Sheet 1, 2 Sheets.
Iron Ship
No. 47. Reissued Oct. 14, 1842.
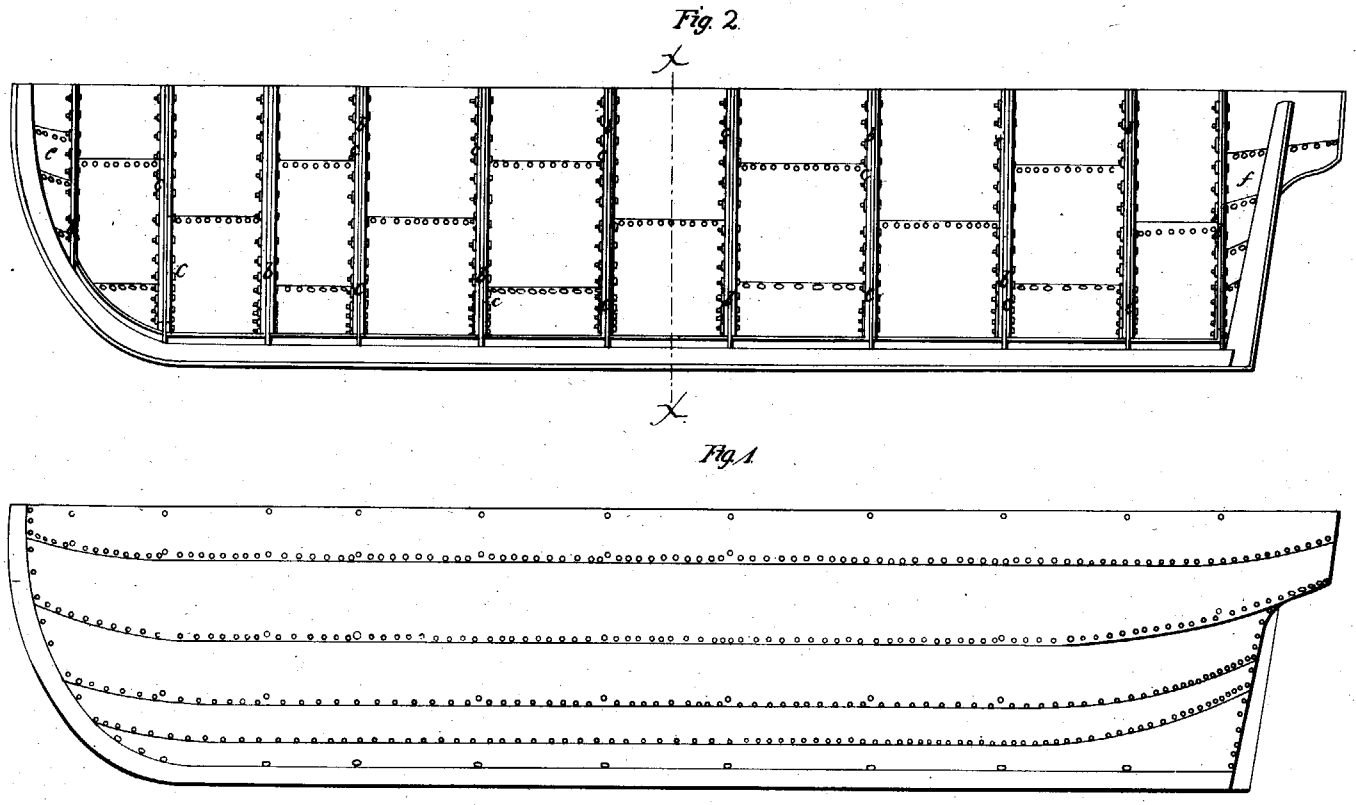

Kerr, Grant & Potter. Sheet 2, 2 Sheets.
Iron Ship.
No. 47. Reissued Oct. 14, 1842.
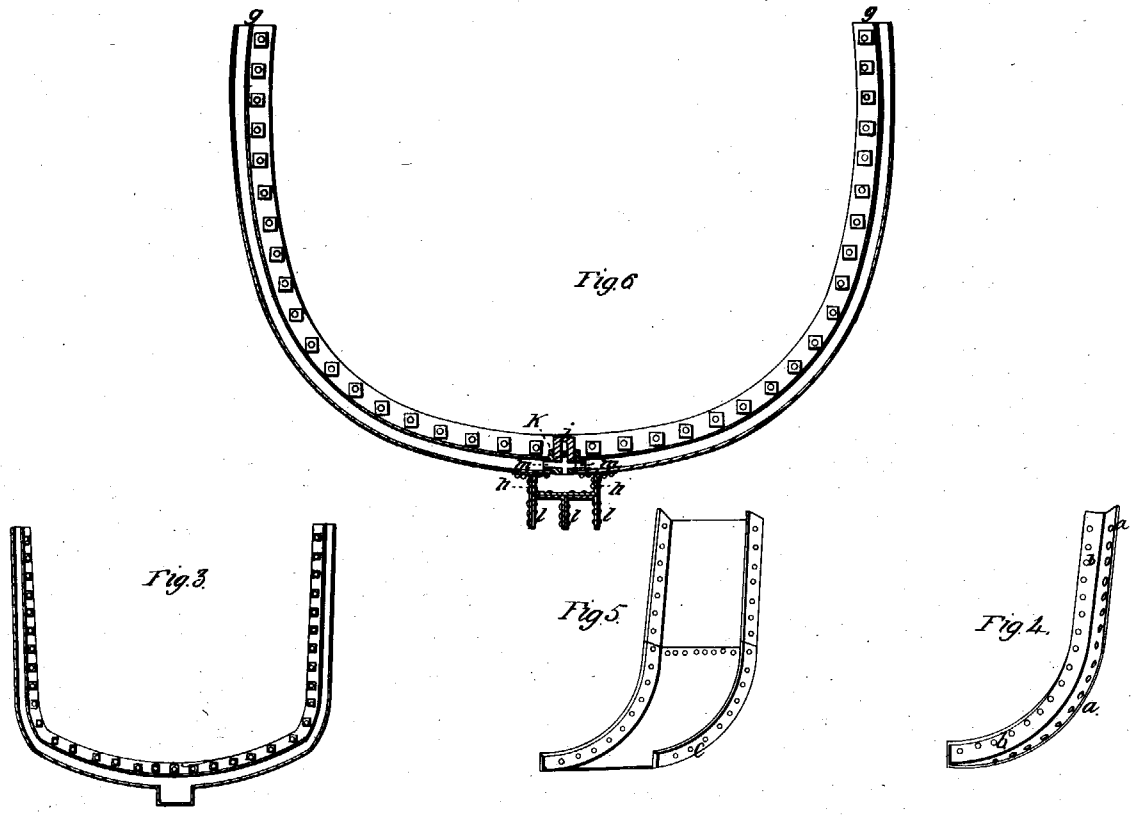

UNITED STATES PATENT OFFICE.

JAMES KERR, WILLIAM GRANT, AND JOHN POTTER, OF PITTSBURG, PA.

IMPROVEMENT IN THE MANNER OF LINING VESSELS CONSTRUCTED OF SHEET-IRON.

Specification forming part of Letters Patent No. 2,612, dated May 7, 1842; Reissue No. 47, dated October 14, 1842.

*To all whom it may concern:*

Be it known that we, JAMES KERR, WILLIAM GRANT, and JOHN POTTER, of Pittsburg, in the county of Allegheny and State of Pennsylvania, have invented a new and improved mode of constructing sheet-iron steamboats, ships, and other vessels intended for navigation; and we do hereby declare that the following is a full and exact description thereof.

A distinguishing feature in our mode of constructing vessels of sheet-iron for the purposes of navigation is the forming them, in whole or in part, of sheets of metal so arranged and combined with each other and with the ribs as to give great stiffness to such vessels, and to leave spaces between the said ribs and between the sheets of metal which shall constitue separate and distinct water-tight chambers or compartments in such manner as that any accidental fracture by which water may be admitted into one of them will not affect the others, and will consequently interfere but little with the security and general buoyancy of the vessel.

In the manner of forming the outer shell or body of our vessels we proceed, in the ordinary way, by preparing and riveting together sheets of metal of a suitable size and form, and these we support by means of ribs of wrought-iron of the kind denominated "gunwale" or "angle" iron, to which ribs the plates forming the outer shell are riveted, and to which, also, the plates forming the lining or inner shell are likewise united by means of rivets or of screw-bolts.

Figure 1, in the accompanying drawings, is an outside view of such a vessel, not differing in appearance, as above remarked, from other vessels of sheet-iron. Fig. 2 shows the interior of one of our vessels as seen in a vertical section thereof through the middle from stem to stern. Fig. 3 is a cross-section in the line *x x* of Fig. 2. Fig. 4 is a portion of one of the ribs of angle-iron. Fig. 5 is a portion of the sheet-metal which is to be attached to the ribs and form the lining or inner shell.

The part *a a* of the ribs of angle-iron is that to which the plates forming the outer shell of the vessel are to be riveted, and the part *b b* that to which the lining-plates, Fig. 5, are to be attached. These plates have flanges *c c* turned up on their edges at such an angle as will adapt them to the particular part of the vessel to which they are to be applied. The width of these flanges must be such as will suffice for the receiving of the rivets or bolts by which they are to be attached to the ribs. The part *b b* of the ribs which stand at a right or any other suitable angle with the part *a a* is to be of such width as shall equal that of the flanges *c c* of the plates, Fig. 5, and of the space which is to be left between the inner and the outer shells which is to constitute the water-tight chambers or compartments above named, the edges of these flanges and of the ribs being intended to be flush with each other. These water-tight compartments may, in vessels of an ordinary size, occupy a space of two inches from shell to shell, and the ribs may be about twenty inches apart; but this may be varied according to the size of the vessel or the judgment of the constructor.

For the convenience of repair, as it may be desirable to have access to the water-tight chambers, we prefer to attach the lining-plates to the ribs by means of screw-bolts instead of by rivets. The respective seams are to be carefully calked and rendered water-tight in a manner that is well understood. Such bulkheads and other inner works are to be constructed as may be required; but a vessel built according to the foregoing description will not be dependent upon these for its stability, the ribs and double shell imparting to it a degree of strength not possessed by those constructed in the usual manner.

It may not be thought necessary in all cases to employ the inner shell or lining throughout the whole interior of the vessel. It may, for example, be omitted in the portions constituting the stem and stern, as at *e* and *f* in Fig. 2, where the plates forming the outer shell are seen; but of this the constructor must judge for himself, and be governed according to circumstances.

Having thus fully set forth the nature of our invention and shown the manner in which the same is to be carried into operation, what we claim therein as new, and desire to secure by Letters Patent, is—

The manner herein described of strengthening iron vessels, and of securing them against danger from leakage by attaching the inner plates between the ribs and bolting them thereto so as to constitute water-tight chambers or compartments around or nearly around the entire hulls of such vessels, the whole being arranged and combined substantially as herein set forth.

JAMES KERR.
WM. GRANT.
JOHN POTTER.

Witnesses:
C. H. WOLFF,
LEONARD S. JOHNS.